(12) United States Patent
Rahman Siddiquee et al.

(10) Patent No.: US 11,164,021 B2
(45) Date of Patent: Nov. 2, 2021

(54) METHODS, SYSTEMS, AND MEDIA FOR DISCRIMINATING AND GENERATING TRANSLATED IMAGES

(71) Applicant: Arizona Board of Regents on behalf of Arizona State University, Scottsdale, AZ (US)

(72) Inventors: Md Mahfuzur Rahman Siddiquee, Tempe, AZ (US); Zongwei Zhou, Tempe, AZ (US); Ruibin Feng, Tempe, AZ (US); Nima Tajbakhsh, Los Angeles, CA (US); Jianming Liang, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/875,680

(22) Filed: May 15, 2020

(65) Prior Publication Data

US 2020/0364477 A1   Nov. 19, 2020

Related U.S. Application Data

(60) Provisional application No. 62/849,030, filed on May 16, 2019.

(51) Int. Cl.
*G06K 9/62* (2006.01)
*G06K 9/00* (2006.01)

(52) U.S. Cl.
CPC ..... *G06K 9/00899* (2013.01); *G06K 9/00362* (2013.01); *G06K 9/6256* (2013.01)

(58) Field of Classification Search
CPC combination set(s) only.
See application file for complete search history.

(56) References Cited

U.S. PATENT DOCUMENTS

2017/0337682 A1* 11/2017 Liao .......................... G06T 7/30
2018/0314716 A1* 11/2018 Kim ......................... G06T 11/00
2019/0035075 A1*  1/2019 Middlebrooks ....... G06T 7/0012
2019/0369191 A1* 12/2019 Gong ................. G01R 33/5608

* cited by examiner

*Primary Examiner* — Quan M Hua
(74) *Attorney, Agent, or Firm* — Elliott, Ostrander & Preston, P.C.

(57) ABSTRACT

Methods, systems, and media for discriminating and generating translated images are provided. In some embodiments, the method comprises: identifying a set of training images, wherein each image is associated with at least one domain from a plurality of domains; training a generator network to generate: i) a first fake image that is associated with a first domain; and ii) a second fake image that is associated with a second domain; training a discriminator network, using as inputs to the discriminator network: i) an image from the set of training images; ii) the first fake image; and iii) the second fake image; and using the generator network to generate, for an image not included in the set of training images at least one of: i) a third fake image that is associated with the first domain; and ii) a fourth fake image that is associated with the second domain.

18 Claims, 3 Drawing Sheets

METHODS, SYSTEMS, AND MEDIA FOR DISCRIMINATING AND GENERATING TRANSLATED IMAGES

CROSS REFERENCE TO RELATED APPLICATIONS

This application claims the benefit of U.S. Provisional Application No. 62/849,030, filed May 16, 2019, which is hereby incorporated by reference herein in its entirety.

STATEMENT REGARDING GOVERNMENT FUNDED RESEARCH

This invention was made with government support under R01 HL128785 awarded by the National Institutes of Health. The government has certain rights in the invention.

TECHNICAL FIELD

The disclosed subject matter relates to methods, systems, and media for discriminating and generating translated images.

BACKGROUND

Generative Adversarial Networks (GANs) are based on a neural network architecture that uses two neural networks, a generator and a discriminator, to mimic distributions of data. In particular, a generator network is trained, using real data (e.g., real images, real sounds, etc.), to generate fake data (e.g., fake images, fake sounds, etc.) that are similar to the real data, and a discriminator network can be trained to discriminate between real and fake data. By combining the generator network and the discriminator network, GANs can produce fake data that is quite similar to real data.

As a particular application, GANs can be trained, using real images, to generate fake images. For example, GANs can be used to translate a real image, that has particular attributes, to generate a fake image that changes one or more of the attributes. As a more particular example, GANs can be used to take an image of a face of a person with particular attributes (e.g., a particular hair color, a particular eye color, etc.) and translate the image with respect to one or more of the attributes (e.g., to have a different hair color, to have a different eye color, etc.). However, one problem with many GANs is that even if a fake image translated from a real image with respect to one attribute is desired, such as an image of a face with a different hair color relative to the real image, the generated fake image may have additional, undesired changes. For example, continuing with the above example where a fake image with a different hair color is desired, the generated fake image may have undesired artifacts, such as a mustache, an additional change in eye color, etc.

Accordingly, it is desirable to provide new methods, systems, and media for discriminating and generating translated images.

SUMMARY

Methods, systems, and media for discriminating and generating translated images are provided. In accordance with some embodiments of the disclosed subject matter, a method for discriminating and generating translated images is provided, the method comprising: identifying a set of training images, wherein each image in the set of training images is associated with at least one domain from a plurality of domains, and wherein each domain corresponds to an attribute of an image; training a generator network of a generative adversarial network to generate, using a first image from the set of training images that is associated with a first domain from the plurality of domains: i) a first fake image that is associated with the first domain from the plurality of domains; and ii) a second fake image that is associated with a second domain from the plurality of domains; training a discriminator network of the generative adversarial network using as inputs to the discriminator network: i) an image from the set of training images; ii) the first fake image that is associated with the first domain from the plurality of domains; and iii) the second fake image that is associated with the second domain from the plurality of domains; and in response to determining that training of the generator network and the discriminator network is complete, using the generator network to generate, for an image not included in the set of training images that is associated with the first domain from the plurality of domains at least one of: i) a third fake image that is associated with the first domain from the plurality of domains; and ii) a fourth fake image that is associated with the second domain from the plurality of domains.

In accordance with some embodiments of the disclosed subject matter, a system for discriminating and generating translated images is provided, the system comprising: a memory; and hardware processor that, when executing computer-executable instructions stored in the memory, is configured to: identify a set of training images, wherein each image in the set of training images is associated with at least one domain from a plurality of domains, and wherein each domain corresponds to an attribute of an image; train a generator network of a generative adversarial network to generate, using a first image from the set of training images that is associated with a first domain from the plurality of domains: i) a first fake image that is associated with the first domain from the plurality of domains; and ii) a second fake image that is associated with a second domain from the plurality of domains; train a discriminator network of the generative adversarial network using as inputs to the discriminator network: i) an image from the set of training images; ii) the first fake image that is associated with the first domain from the plurality of domains; and iii) the second fake image that is associated with the second domain from the plurality of domains; and in response to determining that training of the generator network and the discriminator network is complete, use the generator network to generate, for an image not included in the set of training images that is associated with the first domain from the plurality of domains at least one of: i) a third fake image that is associated with the first domain from the plurality of domains; and ii) a fourth fake image that is associated with the second domain from the plurality of domains.

In accordance with some embodiments of the disclosed subject matter, non-transitory computer-readable media containing computer executable instructions that, when executed by a processor, cause the processor to perform a method for discriminating and generating translated images is provided. The method comprises: identifying a set of training images, wherein each image in the set of training images is associated with at least one domain from a plurality of domains, and wherein each domain corresponds to an attribute of an image; training a generator network of a generative adversarial network to generate, using a first image from the set of training images that is associated with a first domain from the plurality of domains: i) a first fake image that is associated with the first domain from the plurality of domains; and ii) a second fake image that is associated with a second domain from the plurality of domains; training a discriminator network of the generative adversarial network using as inputs to the discriminator network: i) an image from the set of training images; ii) the first fake image that is associated with the first domain from the plurality of domains; and iii) the second fake image that is associated with the second domain from the plurality of domains; and in response to determining that training of the generator network and the discriminator network is complete, using the generator network to generate, for an image not included in the set of training images that is associated with the first domain from the plurality of domains at least one of: i) a third fake image that is associated with the first domain from the plurality of domains; and ii) a fourth fake image that is associated with the second domain from the plurality of domains.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
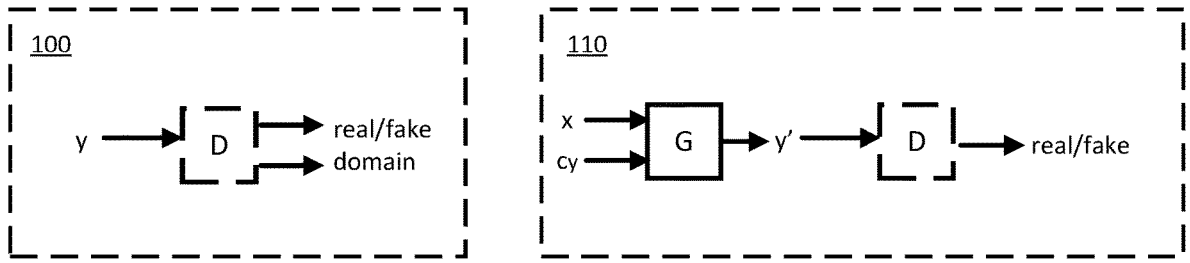
FIGS. 1A, 1B, and 1C show examples of processes for discriminating and generating translated images in accordance with some embodiments of the disclosed subject matter.

In accordance with various embodiments, mechanisms (which can include methods, systems, and media) for discriminating and generating translated images are provided.

In some embodiments, the mechanisms described herein can be used to train a Generative Adversarial Network (GAN) to generate images and/or generate a new image by translating an input image. In some embodiments, a GAN can include a discriminator network and a generator network that are trained in connection with each other. For example, in some embodiments, a generator network can be trained to generate a fake image (e.g., a generated image that is a translation of a real image with respect to a particular attribute, and/or any other suitable fake image), and the discriminator network can be trained to discriminate real images (that is, images that were captured by a camera or other imaging modality) from fake images generated by the generator. Techniques for training a discriminator network and a generator network in connection with each other are shown in and described below in more detail in connection with FIGS. 1A-1C.

In some embodiments, a discriminator network and a generator network can be trained using any suitable type of images. For example, in some embodiments, a discriminator network and a generator network can be trained using images of faces of people. As another example, in some embodiments, a discriminator network and a generator network can be trained using medical images, such as MRI images or CT images of a particular portion of a body of a patient (e.g., a brain or a brain region, a lung, a liver, etc.). In some embodiments, training images can be annotated as being associated with one or more particular domains. For example, in some embodiments, a domain can indicate whether a particular image is classified as being associated with a particular attribute. As a more particular example, in an instance in which images correspond to faces of people, domains can indicate that a person associated with a particular face in an image has black hair, that a person associated with a particular face in an image has blonde hair, that a person associated with a particular face in an image is male, that a person associated with a particular face in an image is young, and/or any other suitable attribute(s). As another more particular example, in an instance in which images correspond to MRI images of one or more particular brain images, domains can include "healthy," "diseased," "tumor," "non-tumor," "cyst," and/or any other suitable domains.

In some embodiments, a generator network can be trained to generate a fake image that is a translation of an input real image with respect to a particular domain. For example, in an instance in which images correspond to faces of people, a generator network can be trained to take, as an input, an image of a face of a person who has black hair and generate a fake image that corresponds to an image of the person with blond hair. As another example, in an instance in which images correspond to medical images of a particular portion of a body, a generator network can be trained to take, as an input, a real image of the portion of the body and generate a translated image corresponding to a healthy domain (that is, a generated image corresponding to a same portion of the body in a healthy state), regardless of whether the input real image depicts a healthy or diseased portion of the body. In some such embodiments, the mechanisms can further generate a difference map that indicates a difference between the generated, translated image (e.g., the translated image in the healthy domain) and the input image. In some embodiments, the difference map can therefore be used to indicate a location of an anomalous portion of the body, such as a location of a lesion or tumor.

Note that, as described below in more detail in connection with FIGS. 1B and 1C, in some embodiments, a generator network can be trained to generate a translated image with respect to a real input image for both a same-domain translation and a cross-domain translation. For example, in an instance in which images correspond to images of faces and in which domains include hair colors included in the images, a generator network can be trained to generate a cross-domain translated image (e.g., by changing a hair color relative to an input image) and a same-domain translated image (e.g., by generating a fake image that maintains attributes in the input image, such as hair color).

Figure 1B:
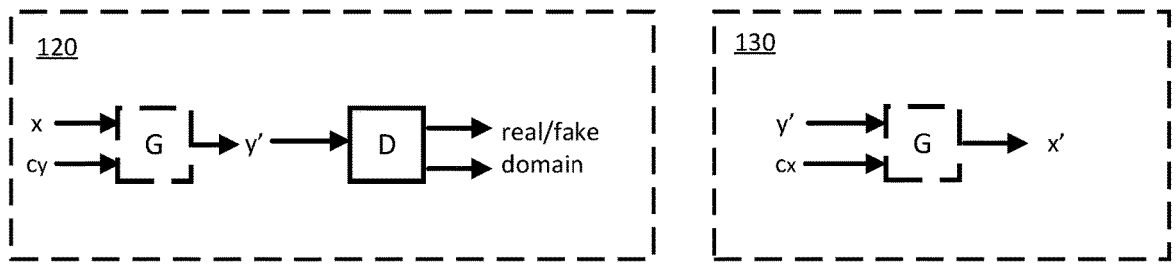
Figure 1C:
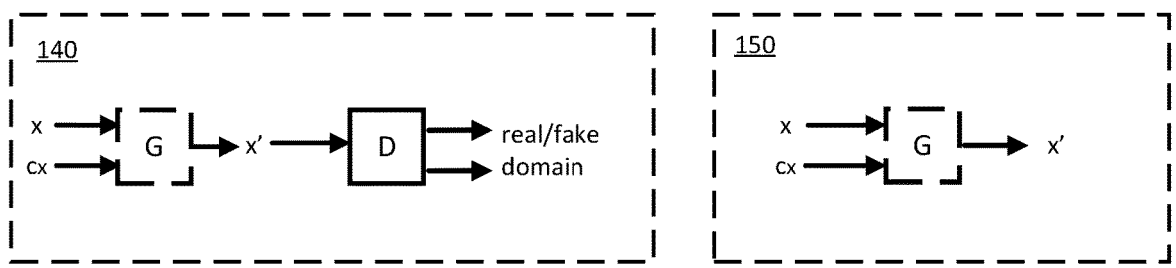
Figure 1C:
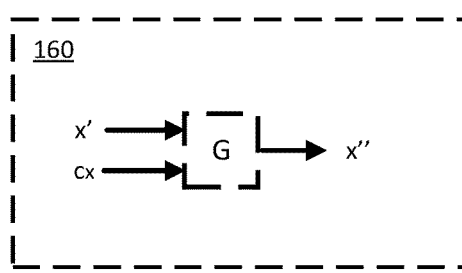

Turning to FIGS. 1A-1C, examples of processes 100-160 for training a generator network (referred to herein as G) and a discriminator network (referred to herein as D) are shown in accordance with some embodiments of the disclosed subject matter. Note that, in some embodiments, training of the generator network and/or the discriminator network can be done on any suitable device, such as a server, a desktop computer, a laptop computer, and/or any other suitable device.

In some embodiments, an iteration through processes 100-160 as shown in FIGS. 1A-1C can be considered one training iteration for the generator network and the discriminator network. In some embodiments, any suitable number of iterations (e.g., 200,000 iterations, 300,000 iterations, and/or any other suitable number of iterations) can be used to train the generator network and the discriminator network. In some embodiments, processes 100-160 can be performed in any suitable order within a training iteration. Note that, with respect to FIGS. 1A-1C, dashed blocks indicate that the corresponding network (either D or G) is being trained, whereas a solid block indicates that the corresponding network is frozen, or held constant, during the process. Additionally, note that x and y refer to real images, x', y', and x" refer to fake images generated by the generator network, and $c \in \{c_x, c_y\}$ refers to a domain of a target image. Note that more particular examples of domains will be described below in connection with FIGS. 1A-1C.

Note that, FIGS. 1A-1C are described below as generally relating to real and fake images. In some embodiments, the images can depict any suitable objects or entities and can be from any suitable source. For example, in some embodiments, an image can be of a face of a person, a natural image (e.g., of a landscape, etc.), and/or any other suitable object. As another example, in some embodiments, an image can be a medical image, such as an image of a portion of a body of a patient (e.g., an image of a brain or a portion of a brain, and/or any other suitable portion of a body of a patient). In some embodiments, images can be captured in any suitable manner. For example, in instances where the images are medical images, images can be captured from any suitable type of medical imaging device (e.g., from an MRI scanner, from a CT scanner, and/or any other suitable type of imaging device). In some embodiments, images can be received from any suitable database of images. As another example, in some embodiments, images can be frames captured from a video (e.g., a video from a medical procedure, and/or any other suitable type of video). Additionally, in some embodiments, any suitable type of data augmentation can be used to generate additional real images for training. For example, in some embodiments, a real training image can be cropped, translated, and/or rotated in any suitable manner to generate additional real training images.

Note that, in some embodiments, training images can be annotated in any suitable manner. For example, in some embodiments, training images can be manually annotated as being associated with particular domains. As a more particular example, in an instance in which training images correspond to images of faces of people, each training image can be associated with manual annotations indicating attributes of the images that correspond to different domains, such as a hair color, a gender, an age group, and/or any other suitable attributes. As another example, in some embodiments, in instances in which the training images correspond to medical images (e.g., MRI images, CT images, and/or any other suitable type of medical images), annotations can be automatically generated using radiological reports associated with the images. As a more particular example, in some embodiments, any suitable Natural Language Processing (NLP) techniques can be applied to a radiological report associated with a particular training image to identify attributes associated with the training image, such as whether the training image shows a healthy portion of a body of a patient, whether the training image includes a tumor, lesion, or other pathology at a location, and/or any other suitable information that can be used to generate annotations for the training image.

Additionally, note that, in some embodiments, any suitable number of images from a dataset of images can be used for training the generator network and the discriminator network (e.g., one thousand images, two thousand images, and/or any other suitable number). In some embodiments, the mechanisms described herein can use a dataset of images (e.g., a dataset of images of faces, a dataset of MRI images of a particular portion of a body, a dataset of CT images of a particular portion of a body, and/or any other suitable dataset) and can construct a training set, a validation set, and/or a testing set using the dataset of images. In some such embodiments, the training set, the validation set, and/or the testing set can each include any suitable number of images.

In some embodiments, real images that are used for training and/or testing the generator network and/or the discriminator network can be processed in any suitable manner prior to training. For example, in some embodiments, images can be cropped and/or re-scaled to any suitable size (e.g., 128×128 pixels, 512×512 pixels, and/or any other suitable size). As another example, in an instance in which images correspond to MRI images, slices that are blank or contain relatively little of the portion of the body of interest can be discarded. As yet another example, in an instance in which images are medical images of a portion of a body (e.g., brain images, liver images, etc.), images can be cropped and/or re-centered such that the portion of the body is centered within the image.

Turning to FIG. 1A, processes 100 and 110 for training the discriminator network are shown in accordance with some embodiments of the disclosed subject matter. Referring to process 100, the discriminator network can take real images as training samples and can be trained to produce an output that classifies domains of the real images. For example, in some embodiments, the discriminator network can be trained to take a real image and classify the real image as being associated with one or more domains. In some embodiments, the one or more domains can correspond to any suitable attributes of images. For example, in an instance in which images correspond to images of faces of people, the one or more domains can include: {black hair; blonde hair; brown hair; male; and young}. That is, in some embodiments, in process 100, the discriminator network can take, as an input, a real image of a face of a person, and produce, as an output, classifications indicating whether the input face image has black hair, blonde hair, brown hair, is an image of a male, and/or is an image of a young person. As another example, in an instance in which images correspond to MRI brain images, the one or more domains can include: {non-brain, non-tumor, necrosis, cyst, and/or hemorrhage; surrounding edema; non-enhancing tumor; enhancing tumor core; and miscellaneous}. As yet another example, in an instance in which images correspond to CT images of lungs, the one or more domains can include: {pulmonary embolism; and non-pulmonary embolism}. Note that, in some embodiments, a particular image can be classified as being associated with any suitable number of domains of the one or more domains. For example, referring to the example given above of images of faces, a first face image can be associated with domains of black hair, male, and young. As another example, in some embodiments, a second face image can be associated with one domain of blonde hair. As yet another example, referring to the example given above of MRI brain images, a particular image can be associated with a single domain of a group of potential domains (e.g., non-enhancing tumor, enhancing tumor core, and/or any other suitable domain). As still another example, referring to the example given above of lung CT images, a particular image can be associated with a single domain of a group of potential domains (e.g., pulmonary embolism, non-pulmonary embolism, and/or any other suitable domain).

Referring to process 110, in some embodiments, the discriminator network can be trained to take a fake image, y', generated by the generator network, and classify the image as real or fake. Note that, as shown by the solid box around the generator network G, in process 110, the generator network can be held constant or frozen while the discriminator network is being trained. In some embodiments, referring to process 110, the generator network can take as inputs a real image x and a domain of the target fake image, $c_y$. For example, in an instance in which the images correspond to images of faces of people, real image x can be an image of a face of a person who has black hair and is male, and $c_y$ can correspond to a domain of the generated fake image y', where y' is associated with at least one domain that is different than the domains associated with real image x. As a more particular example, in an instance in which real image x is associated with the domains of black hair and male, $c_y$ can be blonde hair, indicating that the fake image y' generated by the generator network is to perform a cross-domain translation by translating the real input image x such that y' is an image of a face with blonde hair.

In some embodiments, the discriminator network can be trained using any suitable discriminator loss function, $L_D$. For example, in some embodiments, $L_D$ can be a combination of an adversarial loss function $L_{adv}$ and a domain loss function $L_{domain}$, which are described in more detail below. As a more particular example, an example of the discriminator loss function $L_D$ can be: $L_D=-L_{adv}+\lambda_{domain}L_{domain}^r$.

In some embodiments, optimization of the adversarial loss function $L_{adv}$ can cause the generator network to learn cross- and same-domain translations that look realistic for both. In some embodiments, an example of $L_{adv}$ can be:

$$L_{adv} = E_x[D_{real/fake}(x)] - \sum_{c \in \{c_x, c_y\}} E_{x,c}[D_{real/fake}(G(x,c))] - \lambda_{gp} E_{\hat{x}}[(\|\nabla_{\hat{x}} D_{real/fake}(\hat{x})\|_2 - 1)^2]$$

In some embodiments, $\hat{x}$ can be uniformly sampled along a straight line between a pair of a real image and a fake image. In some embodiments, $\lambda_{gp}$ can be a gradient penalty with any suitable value (e.g., ten, and/or any other suitable value).

In some embodiments, the discriminator network can be trained using the domain loss function $L_{domain}$, which can cause generated images to be of the correct domain. In some embodiments, the domain loss function can have two components, $L_{domain}^r$ that is incorporated in the discriminator loss function $L_D$ as shown above, and $L_{domain}^f$ that is incorporated in a generator loss function $L_G$, described below in more detail. In some embodiments, an example of $L_{domain}^r$ can be:

$$\mathcal{L}_{domain}^r = \mathbb{E}_{x,c_x}[-\log D_{domain}(c_x|x)]$$

In some embodiments, $\lambda_{domain}$ can be any suitable weight associated with the domain loss function, and can have any suitable value (e.g., one, five, ten, and/or any other suitable value).

Turning to FIG. 1B, examples 120 and 130 of processes for training the generator network to generate fake images in a cross-domain translation are shown in accordance with some embodiments of the disclosed subject matter. For example, in some embodiments, the generator network can be trained to take as an input, an image (either real or fake) that is associated with a first domain, and generate, as an output, a fake image that is associated with a second domain that is different than the first domain. As a more particular example, in an instance in which the generator network is trained using images of faces of people, the generator network can take as an input an image of a face of a person who has black hair (either a real image or a fake image), and can be trained to produce, as an output, a fake image of a face of a person who has a different color of hair, such as blonde hair.

Referring to process 120, in some embodiments, the generator network, G, can be trained to take as inputs a real image x and a domain associated with a target fake image $c_y$, where the domain associated with the target fake image is a domain not associated with the real image x, and produce, as an output, a fake image y'. For example, in an instance in which the real image x is an image of a face of a person who has black hair, the domain $c_y$ can correspond to a different hair color, such as blonde hair, thereby indicating that the generated fake image y' is to have blonde hair. In some embodiments, the discriminator network D can take as an input, the fake image y' and can produce as an output, a domain classification associated with the fake image y'. Note that, as shown in FIG. 1B, the discriminator network D can be held constant, or frozen, during training of the generator network G.

Referring to process 130, in some embodiments, the generator network can be trained to take as inputs, the fake image y' and a domain associated with a target fake image $c_x$, where the domain associated with the target fake image is a domain not associated with the fake image y'. For example, in an instance where the fake image y' is an image of a face of a person who has blonde hair, the domain $c_x$ can correspond to a different hair color, such as black hair, thereby indicating that the generated fake image x' is to have black hair.

Turning to FIG. 1C, examples 140, 150, and 160 of processes for training the generator network G to generate fake images in a same-domain translation are shown in accordance with some embodiments of the disclosed subject matter. For example, in some embodiments, the generator network can be trained to take as an input, an image (either real or fake) that is associated with a first domain, and generate, as an output, a fake image that is associated with the first domain. As a more particular example, in an instance in which the generator network is trained using images of faces of people, the generator network can take as an input, an image of a face of a person who has black hair (either a real image or a fake image), and can be trained to produce, as an output, a fake image of a face of a person who has the same color hair (that is, black hair).

Referring to process 140, in some embodiments, the generator network G can be trained to take as inputs, a real image x, and an indication of a target domain $c_x$ that corresponds to a domain associated with the real image x, and produce, as an output, a fake image x' that is also associated with the same domain as the real image x. For example, in an instance where the images correspond to images of faces of people, and where x is a real image of a face of a person who has black hair (that is, where $c_x$ corresponds to black hair), x' can be a fake image generated by the generator network of the face of the person having black hair. Note that, in some embodiments, the generator network can be trained such that x' is ideally substantially the same or close to x. In some such embodiments, loss functions that cause the generator network to find a minimal transformation such that x' is substantially the same or close to x are described below in more detail below. In some embodiments, the generated fake image x' can then be used as an input to the discriminator network, which can produce, as an output, domain classifications for the fake image x'. Note that, in some embodiments, the discriminator network can be held constant, or frozen, during execution of process 140.

Referring to process 150, in some embodiments, the generator network G can be trained to take as inputs a real image x and the domain $c_x$, and produce, as an output, a fake image x' that is also associated with the same domain as the real image x. For example, in an instance where the images correspond to images of faces of people, and where x is a real image of a face of a person who has black hair (that is, where $c_x$ corresponds to black hair), x' can be a fake image generated by the generator network of the face of the person having black hair. Note that, in some embodiments, a conditional identity loss function $L_{id}$ can be used during training of the generator network during execution of process 150. In some embodiments, the conditional identity loss function $L_{id}$ can cause the generator network to be penalized when the generator network produces changes in the fake image x' that are irrelevant to the target domain $c_x$. That is, during training of the generator network using same-domain translation (as shown in FIG. 1C), use of the conditional identity loss function $L_{id}$ can cause the generator network to learn a minimal transformation for translating the input image. In some embodiments, $L_{id}$ can correspond to a difference between the real image x and the fake image x', such that $L_{id}=\|x-x'\|$. In some embodiments, an example of $L_{id}$ can be:

$$\mathcal{L}_{id} = \begin{cases} 0, & c = c_y \\ \mathbb{E}_{x,c}[\|G(x,c) - x\|_1], & c = c_x \end{cases}.$$

Referring to process 160, in some embodiments, the generator network G can be trained to take, as inputs, the fake image x' and the domain $c_x$ and produce, as an output, a second fake image x'' that is also associated with the same domain corresponding to $c_x$. For example, in an instance where the images correspond to images of faces of people, and where x' is a fake image of a face of a person who has black hair (that is, where $c_x$ corresponds to black hair), x'' can be a second fake image generated by the generator network of the face of the person having black hair. Note that, in some embodiments, the conditional identity loss function $L_{id}$ (as described above in connection with process 150) can be used during training of the generator network during execution of process 160. In some embodiments, $L_{id}$ can correspond to a difference between the first fake image x' and the second fake image x'', such that $L_{id}=\|x'-x''\|$.

Referring to FIGS. 1B and 1C, in some embodiments, the generator network G can be trained to optimize a generator loss function $L_G$. For example, in some embodiments, the generator loss function $L_G$ can be: $L_G = L_{adv} + \lambda_{domain} L_{domain}^f + \lambda_{cyc} L_{cyc} + \lambda_{id} L_{id}$. Note that, $L_{adv}$, $\lambda_{domain}$, and $L_{id}$ are described above. In some embodiments, $\lambda_{id}$ can be any suitable weight associated with the conditional identity loss function $L_{id}$, and can have any suitable value (e.g., 0.1, one, five, ten, and/or any other suitable value).

In some embodiments, $L_{domain}^f$ can be a domain classification loss function that is incorporated into the generator loss function $L_G$, as shown above. In some embodiments, an example of $L_{domain}^f$ can be:

$$\mathcal{L}_{domain}^f = \sum_{c \in \{c_x, c_y\}} \mathbb{E}_{x,c}[-\log D_{domain}(c \mid G(x, c))].$$

In some embodiments, $L_{cyc}$ can be a cycle consistency loss function that can be used to cause the generator network G to learn a transformation that preserves enough input information such that the generated image can be translated back to the original domain. In some embodiments, the cycle consistency loss function $L_{cyc}$ can additionally ensure that both cross-domain and same-domain translations are cycle consistent. In some embodiments, an example of $L_{cyc}$ can be:

$$\mathcal{L}_{cyc} = \mathbb{E}_{x,c_x,c_y}[\|G(G(x,c_y),c_x) - x\|_1] + \mathbb{E}_{x,c_x}[\|G(G(x,c_x),c_x) - x\|_1]$$

In some embodiments, $\lambda_{cyc}$ can be any suitable weight associated with the cycle consistency loss function $L_{cyc}$, and can have any suitable value (e.g., five, ten, and/or any other suitable value).

Note that, in some embodiments, weights for portions of a loss function (e.g., $\lambda_{domain}$, $\lambda_{cyc}$, and/or $\lambda_{id}$) can be set based on a particular application. For example, in some embodiments, a weight such as $\lambda_{id}$ can have a first value (e.g., ten) when used for an application for translating images of faces, and can have a second value (e.g., 0.1) when used for generating images of healthy and/or diseased brain images.

In some embodiments, the generator network and the discriminator network can be trained using any suitable number of iterations (e.g., 200,000 iterations, 300,000 iterations, and/or any other suitable number). In some embodiments, the number of iterations required to train the discriminator network and the generator network can vary based on an application (e.g., a type of image used for training). In some embodiments, loss functions as shown and described above can be optimized in any suitable manner (e.g., using the Adam optimizer, and/or in any other suitable manner) and/or with any suitable learning rate (e.g., $1e^{-4}$, and/or any other suitable learning rate).

In some embodiments, the generator network can be used to predict a residual (delta) map rather than generating the desired image directly. For example, in some embodiments, an output of the generator network can be computed by adding the delta map to the input image followed by application of a tanh activation function. As a more particular example, in some embodiments, the output of the generator network can be computed as: $\tanh(G(x,c)+x)$. In some embodiments, delta map learning can be combined with fixed-point translation learning, as described above in connection with FIGS. 1A, 1B, and 1C.

Note that, in some embodiments, a trained generator network can be used to generate a difference map. In some embodiments, the difference map can indicate a location of an anomaly in a medical image of a portion of a body of a patient, such as a location of a lesion, tumor, nodule, etc. For example, in an instance in which the discriminator network and the generator network are trained using MRI images of one or more brain regions which are annotated as being associated with domains such as "healthy," "diseased," "tumor," "non-tumor," etc. as described above, the generator network can then take as an input a test image of an MRI of one or more brain regions. Continuing with this example, the generator network can then produce as an output the test image translated to a healthy domain. The generator network can then calculate the difference map as a difference between the test image translated to the healthy domain and the input test image, and the difference map can therefore indicate a location of a diseased portion of the brain (e.g., a location of a tumor, etc.), if any. In some embodiments, a difference map can then be evaluated or processed in any suitable manner to detect and/or identify a diseased portion. For example, in some embodiments, a maximum value across all pixels in the difference map can be calculated as the detection score, and receiver operating characteristic (ROC) curves can then be calculated using the resultant detection scores. As another example, in some embodiments, difference maps can be binarized using color quantization or any other suitable technique(s) followed by clustering foreground pixels into connected components. In some embodiments, a connected component with an area larger than a predetermined threshold (e.g., ten pixels, and/or any other suitable size) can be considered as a diseased portion (e.g., a lesion, tumor, etc.). In some such embodiments, a lesion or other diseased portion can be considered detected if the centroid of a lesion candidate falls inside a lesion ground truth area.

In some embodiments, a performance of the discriminator network and/or the generator network can be evaluated in any suitable manner. For example, in some embodiments, cross-domain image translation can be evaluated qualitatively by changing one attribute (e.g., hair color, gender, age, etc.) from the source domain at a time, facilitating tracking changes to image content. As a more particular example, in some embodiments, the mechanisms can identify changes made to a generated image other than desired changes related to the desired target domain. As another example, in some embodiments, same-domain image translation can be evaluated both qualitatively and quantitatively by measuring image-level $L_1$ distance between input and translated images.

Figure 2:
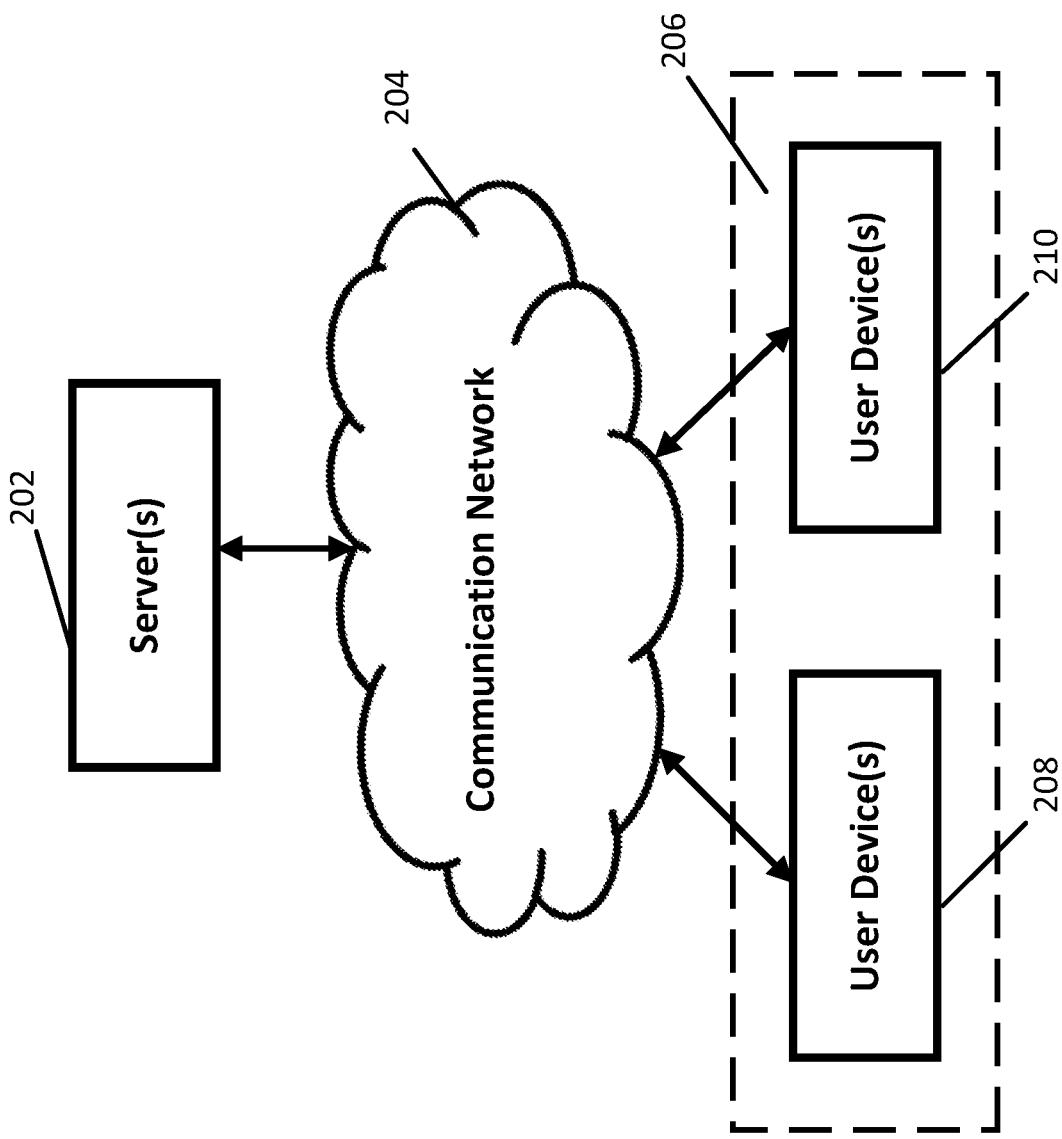
FIG. 2 shows an example of a schematic diagram of an illustrative system suitable for implementation of mechanisms described herein for discriminating and generating translated images in accordance with some embodiments of the disclosed subject matter.

Turning to FIG. 2, an example 200 of hardware for discriminating and generating translated images that can be used in accordance with some embodiments of the disclosed subject matter is shown. As illustrated, hardware 200 can include a server 202, a communication network 204, and/or one or more user devices 206, such as user devices 208 and/or 210.

Server 202 can be any suitable server(s) for storing information, datasets, programs, and/or any other suitable type of content. For example, in some embodiments, server 202 can store any suitable datasets used for training, validating, or testing a network for discriminating and generating translated images. In some embodiments, server 202 can transmit any portion of any suitable dataset to user devices 206, for example, in response to a request from user devices 206. Note that, in some embodiments, server 202 can execute any suitable programs or algorithms for discriminating and generating translated images. For example, in some embodiments, server 202 can execute any of the blocks shown in and described above in connection with FIGS. 1A, 1B, and/or 1C for training a network to discriminating and generating translated images. In some such embodiments, server 202 can receive any suitable parameters associated with training the network (e.g., a learning rate to be used, an indication of an optimization library to be used, values of weights included in one or more loss functions, and/or any other suitable parameters) from user devices 206. In some embodiments, server 202 can be omitted.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links to communication network 204 that can be linked via one or more communications links to server 202. The communications links can be any communications links suitable for communicating data among user devices 206 and server 202 such as network links, dial-up links, wireless links, hard-wired links, any other suitable communications links, or any suitable combination of such links.

User devices 206 can include any one or more user devices. In some embodiments, user devices 206 can perform any suitable function(s). For example, in some embodiments, user devices 206 can execute any suitable blocks shown in and described above in connection with FIGS. 1A, 1B, and/or 1C for discriminating and generating translated images. As another example, in some embodiments, user devices 206 can initiate execution of any suitable blocks of the processes shown in and described above in connection with FIGS. 1A, 1B, and/or 1C on server 202, for example, by transmitting instructions to server 202 in connection with any suitable parameters for training a network for discriminating and generating translated images. In some embodiments, user devices 206 can include any suitable types of user devices, such as a desktop computer, a laptop computer, a mobile phone, a tablet computer, and/or any other suitable type of user device.

Although server 202 is illustrated as one device, the functions performed by server 202 can be performed using any suitable number of devices in some embodiments. For example, in some embodiments, multiple devices can be used to implement the functions performed by server 202.

Although two user devices 208 and 210 are shown in FIG. 2 to avoid over-complicating the figure, any suitable number of user devices, and/or any suitable types of user devices, can be used in some embodiments.

Figure 3:
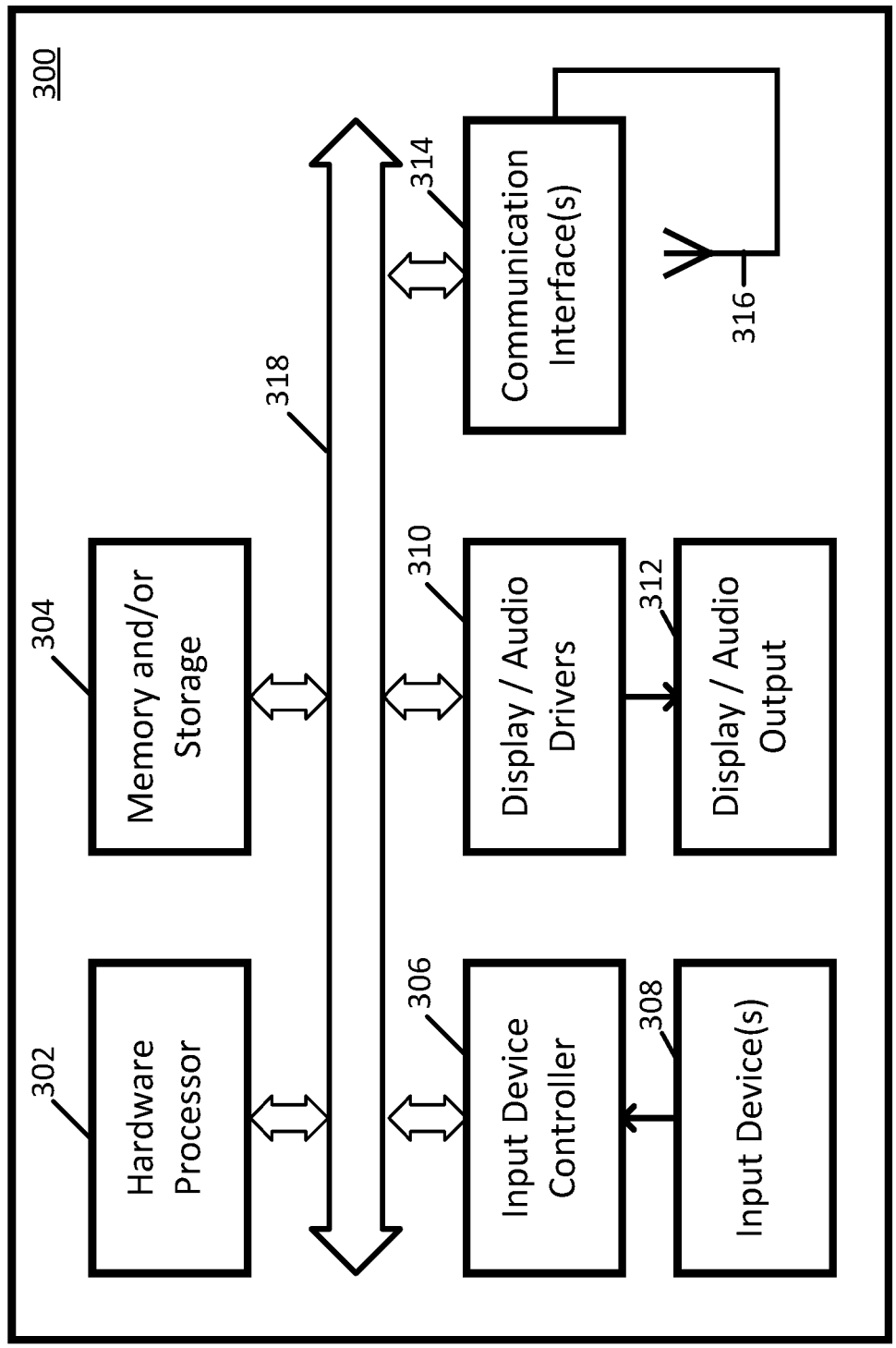
FIG. 3 shows a detailed example of hardware that can be used in a server and/or a user device of FIG. 2 in accordance with some embodiments of the disclosed subject matter.

Server 202 and user devices 206 can be implemented using any suitable hardware in some embodiments. For example, in some embodiments, devices 202 and 206 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 302 can be controlled by a server program stored in memory and/or storage of a server, such as server 202. In some embodiments, hardware processor 302 can be controlled by a computer program stored in memory and/or storage 304 of user device 206.

Memory and/or storage 304 can be any suitable memory and/or storage for storing programs, data, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks (e.g., computer network 204). For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

In some embodiments, at least some of the above described blocks of the processes of FIGS. 1A, 1B, and 1C can be executed or performed in any order or sequence not limited to the order and sequence shown in and described in connection with the figures. Also, some of the above blocks of FIGS. 1A, 1B, and 1C can be executed or performed substantially simultaneously where appropriate or in parallel to reduce latency and processing times. Additionally or alternatively, some of the above described blocks of the processes of FIGS. 1A-1C can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In accordance with some embodiments of the disclosed subject matter, a method for discriminating and generating translated images is provided, the method comprising: identifying a set of training images, wherein each image in the set of training images is associated with at least one domain from a plurality of domains, and wherein each domain corresponds to an attribute of an image; training a generator network of a generative adversarial network to generate, using a first image from the set of training images that is associated with a first domain from the plurality of domains: i) a first fake image that is associated with the first domain from the plurality of domains; and ii) a second fake image that is associated with a second domain from the plurality of domains; training a discriminator network of the generative adversarial network using as inputs to the discriminator network: i) an image from the set of training images; ii) the first fake image that is associated with the first domain from the plurality of domains; and iii) the second fake image that is associated with the second domain from the plurality of domains; and in response to determining that training of the generator network and the discriminator network is complete, using the generator network to generate, for an image not included in the set of training images that is associated with the first domain from the plurality of domains at least one of: i) a third fake image that is associated with the first domain from the plurality of domains; and ii) a fourth fake image that is associated with the second domain from the plurality of domains.

In some embodiments, each image in the set of training images corresponds to an image of a portion of a body of a patient, and wherein each domain in the plurality of domains corresponds to a presence or an absence of a disease state in an image.

In some embodiments, the first domain corresponds to a presence of a lesion in the image of the portion of the body of the patient, and wherein the second domain corresponds to a lack of a lesion in the image of the portion of the body of the patient.

In some embodiments, the method further comprises generating a difference map by subtracting the fourth fake image that is associated with the second domain from the image not included in the training set.

In some embodiments, training the generator network comprises optimizing a generator loss function, and wherein the generator loss function includes a penalty based on the generated first fake image associated with the first domain of the plurality of domains.

In some embodiments, training the generator network comprises optimizing a generator loss function, and wherein the generator loss function includes a penalty based on the generated second fake image associated with the second domain of the plurality of domains.

In accordance with some embodiments of the disclosed subject matter, a system for discriminating and generating translated images is provided, the system comprising: a memory; and hardware processor that, when executing computer-executable instructions stored in the memory, is configured to: identify a set of training images, wherein each image in the set of training images is associated with at least one domain from a plurality of domains, and wherein each domain corresponds to an attribute of an image; train a generator network of a generative adversarial network to generate, using a first image from the set of training images that is associated with a first domain from the plurality of domains: i) a first fake image that is associated with the first domain from the plurality of domains; and ii) a second fake image that is associated with a second domain from the plurality of domains; train a discriminator network of the generative adversarial network using as inputs to the discriminator network: i) an image from the set of training images; ii) the first fake image that is associated with the first domain from the plurality of domains; and iii) the second fake image that is associated with the second domain from the plurality of domains; and in response to determining that training of the generator network and the discriminator network is complete, use the generator network to generate, for an image not included in the set of training images that is associated with the first domain from the plurality of domains at least one of: i) a third fake image that is associated with the first domain from the plurality of domains; and ii) a fourth fake image that is associated with the second domain from the plurality of domains.

In some embodiments, each image in the set of training images corresponds to an image of a portion of a body of a patient, and wherein each domain in the plurality of domains corresponds to a presence or an absence of a disease state in an image.

In some embodiments, the first domain corresponds to a presence of a lesion in the image of the portion of the body of the patient, and wherein the second domain corresponds to a lack of a lesion in the image of the portion of the body of the patient.

In some embodiments, the hardware processor is further configured to generate a difference map by subtracting the fourth fake image that is associated with the second domain from the image not included in the training set.

In some embodiments, training the generator network comprises optimizing a generator loss function, and wherein the generator loss function includes a penalty based on the generated first fake image associated with the first domain of the plurality of domains.

In some embodiments, training the generator network comprises optimizing a generator loss function, and wherein the generator loss function includes a penalty based on the generated second fake image associated with the second domain of the plurality of domains.

In accordance with some embodiments of the disclosed subject matter, non-transitory computer-readable media containing computer executable instructions that, when executed by a processor, cause the processor to perform a method for discriminating and generating translated images is provided. The method comprises: identifying a set of training images, wherein each image in the set of training images is associated with at least one domain from a plurality of domains, and wherein each domain corresponds to an attribute of an image; training a generator network of a generative adversarial network to generate, using a first image from the set of training images that is associated with a first domain from the plurality of domains: i) a first fake image that is associated with the first domain from the plurality of domains; and ii) a second fake image that is associated with a second domain from the plurality of domains; training a discriminator network of the generative adversarial network using as inputs to the discriminator network: i) an image from the set of training images; ii) the first fake image that is associated with the first domain from the plurality of domains; and iii) the second fake image that is associated with the second domain from the plurality of domains; and in response to determining that training of the generator network and the discriminator network is complete, using the generator network to generate, for an image not included in the set of training images that is associated with the first domain from the plurality of domains at least one of: i) a third fake image that is associated with the first domain from the plurality of domains; and ii) a fourth fake image that is associated with the second domain from the plurality of domains.

In some embodiments, each image in the set of training images corresponds to an image of a portion of a body of a patient, and wherein each domain in the plurality of domains corresponds to a presence or an absence of a disease state in an image.

In some embodiments, the first domain corresponds to a presence of a lesion in the image of the portion of the body of the patient, and wherein the second domain corresponds to a lack of a lesion in the image of the portion of the body of the patient.

In some embodiments, the method further comprises generating a difference map by subtracting the fourth fake image that is associated with the second domain from the image not included in the training set.

In some embodiments, training the generator network comprises optimizing a generator loss function, and wherein the generator loss function includes a penalty based on the generated first fake image associated with the first domain of the plurality of domains.

In some embodiments, training the generator network comprises optimizing a generator loss function, and wherein the generator loss function includes a penalty based on the generated second fake image associated with the second domain of the plurality of domains.

Accordingly, methods, systems, and media for discriminating and generating translated images are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for discriminating and generating translated images, comprising:
    identifying a set of training images, wherein each image in the set of training images is associated with at least one domain from a plurality of domains, and wherein each domain corresponds to an attribute of an image;
    training a generator network of a generative adversarial network to generate, using a first image from the set of training images that is associated with a first domain from the plurality of domains: i) a first fake image that is associated with the first domain from the plurality of domains; and ii) a second fake image that is associated with a second domain from the plurality of domains;
    training a discriminator network of the generative adversarial network using as inputs to the discriminator network: i) an image from the set of training images; ii) the first fake image that is associated with the first domain from the plurality of domains; and iii) the second fake image that is associated with the second domain from the plurality of domains; and
    in response to determining that training of the generator network and the discriminator network is complete, using the generator network to generate, for an image not included in the set of training images that is associated with the first domain from the plurality of domains at least one of: i) a third fake image that is associated with the first domain from the plurality of domains; and ii) a fourth fake image that is associated with the second domain from the plurality of domains.

2. The method of claim 1, wherein each image in the set of training images corresponds to an image of a portion of a body of a patient, and wherein each domain in the plurality of domains corresponds to a presence or an absence of a disease state in an image.

3. The method of claim 2, wherein the first domain corresponds to a presence of a lesion in the image of the portion of the body of the patient, and wherein the second domain corresponds to a lack of a lesion in the image of the portion of the body of the patient.

4. The method of claim 3, further comprising generating a difference map by subtracting the fourth fake image that is associated with the second domain from the image not included in the training set.

5. The method of claim 1, wherein training the generator network comprises optimizing a generator loss function, and wherein the generator loss function includes a penalty based on the generated first fake image associated with the first domain of the plurality of domains.

6. The method of claim 1, wherein training the generator network comprises optimizing a generator loss function, and wherein the generator loss function includes a penalty based on the generated second fake image associated with the second domain of the plurality of domains.

7. A system for discriminating and generating translated images, the system comprising:
   a memory; and
   a hardware processor that, when executing computer-executable instructions stored in the memory, is configured to:
      identify a set of training images, wherein each image in the set of training images is associated with at least one domain from a plurality of domains, and wherein each domain corresponds to an attribute of an image;
      train a generator network of a generative adversarial network to generate, using a first image from the set of training images that is associated with a first domain from the plurality of domains: i) a first fake image that is associated with the first domain from the plurality of domains; and ii) a second fake image that is associated with a second domain from the plurality of domains;
      train a discriminator network of the generative adversarial network using as inputs to the discriminator network: i) an image from the set of training images; ii) the first fake image that is associated with the first domain from the plurality of domains; and iii) the second fake image that is associated with the second domain from the plurality of domains; and
      in response to determining that training of the generator network and the discriminator network is complete, use the generator network to generate, for an image not included in the set of training images that is associated with the first domain from the plurality of domains at least one of: i) a third fake image that is associated with the first domain from the plurality of domains; and ii) a fourth fake image that is associated with the second domain from the plurality of domains.

8. The system of claim 7, wherein each image in the set of training images corresponds to an image of a portion of a body of a patient, and wherein each domain in the plurality of domains corresponds to a presence or an absence of a disease state in an image.

9. The system of claim 8, wherein the first domain corresponds to a presence of a lesion in the image of the portion of the body of the patient, and wherein the second domain corresponds to a lack of a lesion in the image of the portion of the body of the patient.

10. The system of claim 9, wherein the hardware processor is further configured to generate a difference map by subtracting the fourth fake image that is associated with the second domain from the image not included in the training set.

11. The system of claim 7, wherein training the generator network comprises optimizing a generator loss function, and wherein the generator loss function includes a penalty based on the generated first fake image associated with the first domain of the plurality of domains.

12. The system of claim 7, wherein training the generator network comprises optimizing a generator loss function, and wherein the generator loss function includes a penalty based on the generated second fake image associated with the second domain of the plurality of domains.

13. A non-transitory computer-readable medium containing computer executable instructions that, when executed by a processor, cause the processor to perform a method for discriminating and generating translated images, the method comprising:
   identifying a set of training images, wherein each image in the set of training images is associated with at least one domain from a plurality of domains, and wherein each domain corresponds to an attribute of an image;
   training a generator network of a generative adversarial network to generate, using a first image from the set of training images that is associated with a first domain from the plurality of domains: i) a first fake image that is associated with the first domain from the plurality of domains; and ii) a second fake image that is associated with a second domain from the plurality of domains;
   training a discriminator network of the generative adversarial network using as inputs to the discriminator network: i) an image from the set of training images; ii) the first fake image that is associated with the first domain from the plurality of domains; and iii) the second fake image that is associated with the second domain from the plurality of domains; and
   in response to determining that training of the generator network and the discriminator network is complete, using the generator network to generate, for an image not included in the set of training images that is associated with the first domain from the plurality of domains at least one of: i) a third fake image that is associated with the first domain from the plurality of domains; and ii) a fourth fake image that is associated with the second domain from the plurality of domains.

14. The non-transitory computer-readable medium of claim 13, wherein each image in the set of training images corresponds to an image of a portion of a body of a patient, and wherein each domain in the plurality of domains corresponds to a presence or an absence of a disease state in an image.

15. The non-transitory computer-readable medium of claim 14, wherein the first domain corresponds to a presence of a lesion in the image of the portion of the body of the patient, and wherein the second domain corresponds to a lack of a lesion in the image of the portion of the body of the patient.

16. The non-transitory computer-readable medium of claim 15, wherein the method further comprises generating a difference map by subtracting the fourth fake image that is associated with the second domain from the image not included in the training set.

17. The non-transitory computer-readable medium of claim 13, wherein training the generator network comprises optimizing a generator loss function, and wherein the generator loss function includes a penalty based on the generated first fake image associated with the first domain of the plurality of domains.

18. The non-transitory computer-readable medium of claim 13, wherein training the generator network comprises optimizing a generator loss function, and wherein the generator loss function includes a penalty based on the generated second fake image associated with the second domain of the plurality of domains.

* * * * *